United States Patent [19]

Yamada

[11] 4,153,358
[45] May 8, 1979

[54] INFORMATION SETTING APPARATUS FOR CAMERAS

[75] Inventor: Seiji Yamada, Sakai, Japan

[73] Assignee: Minolta Camera Kabushiki Kaisha, Osaka, Japan

[21] Appl. No.: 819,063

[22] Filed: Jul. 26, 1977

[30] Foreign Application Priority Data

Aug. 3, 1976 [JP] Japan .................................. 51-92959

[51] Int. Cl.² ...................... G03B 17/18; G03B 17/24
[52] U.S. Cl. .................................. 354/106; 354/23 D; 354/289
[58] Field of Search ............. 354/105, 106, 109, 23 D, 354/60 L, 289; 355/40; 58/22.9, 39.5, 74, 23 A; 235/92 FP, 92 T; 340/309.4

[56] References Cited

U.S. PATENT DOCUMENTS

| 3,760,582 | 9/1973 | Thiess et al. | 58/23 A |
| 3,882,512 | 5/1975 | Lawrence et al. | 354/109 |
| 3,937,002 | 2/1976 | Van Haaften | 58/23 BA |
| 3,953,868 | 4/1976 | Kawamura et al. | 354/109 |
| 4,010,603 | 3/1977 | Forsyth | 58/39.5 |

*Primary Examiner*—Michael L. Gellner
*Attorney, Agent, or Firm*—Watson, Cole, Grindle & Watson

[57] ABSTRACT

Information setting apparatus for a camera comprises pulse generating circuitry, pulse counting circuitry and apparatus for visually displaying variable digital information represented by the pulse count in the pulse counting circuitry. The digital information displayed is changed by altering the pulse count stored in the counting circuitry. A manually operable switch stops the pulse input to the counting circuitry to fix the digital information displayed by the display apparatus in accordance with the desired setting. Apparatus is provided for projecting an image of the displayed information onto the camera film. In cameras provided with a viewfinder, the image of the displayed information is projected into the viewfinder field of view.

13 Claims, 3 Drawing Figures

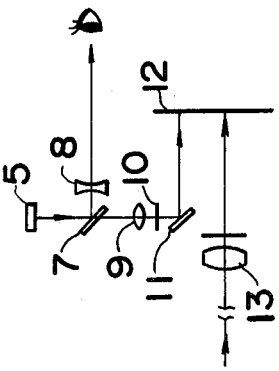
FIG.3
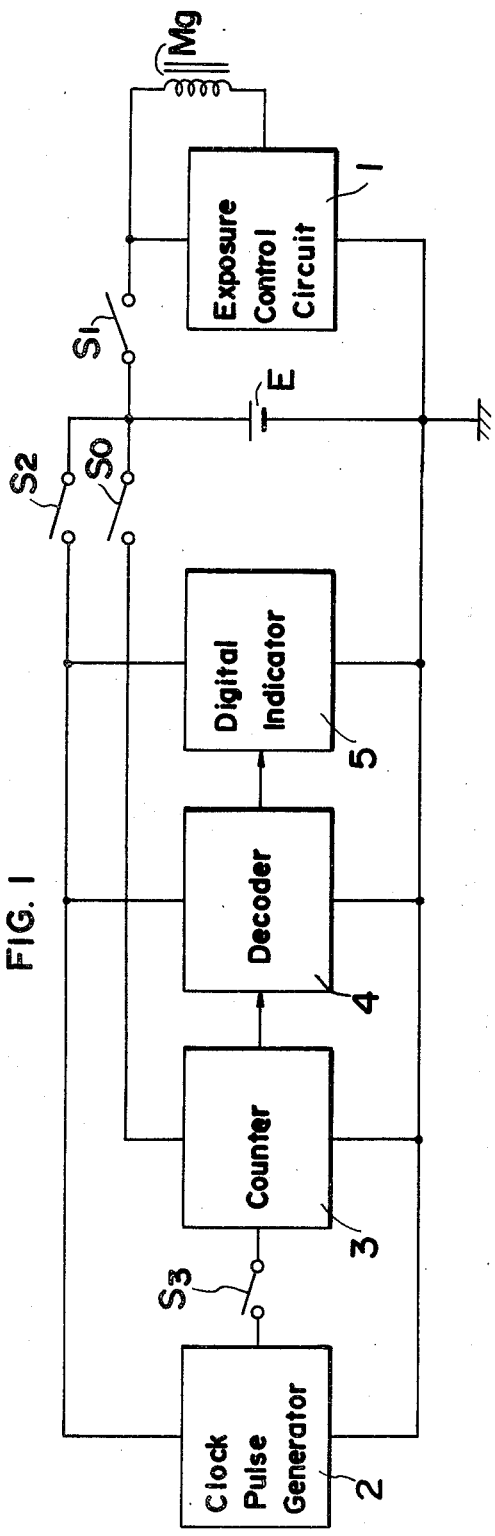
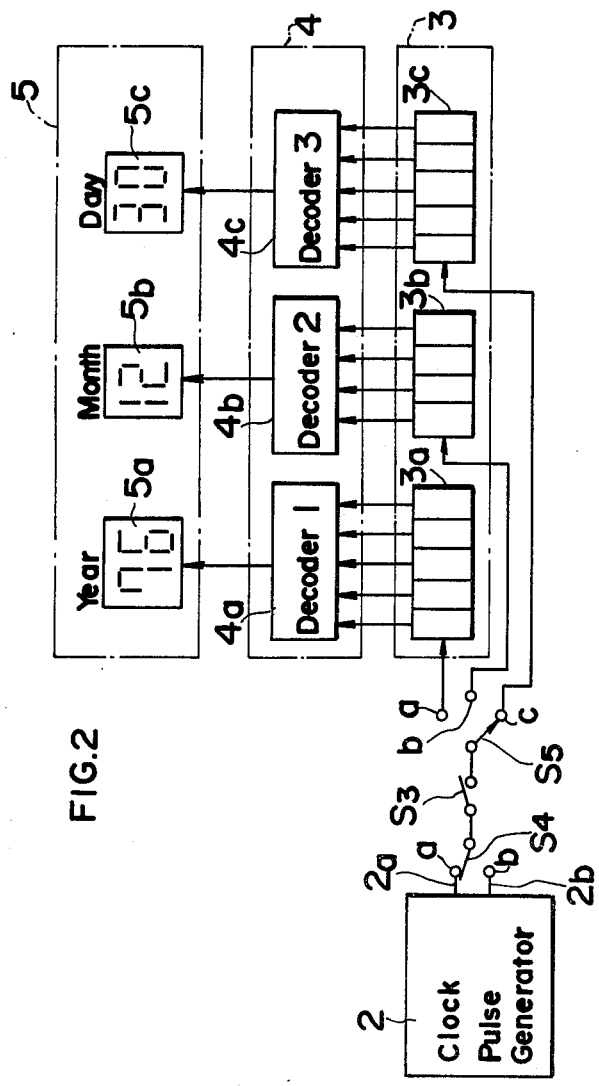

INFORMATION SETTING APPARATUS FOR CAMERAS

BACKGROUND OF THE INVENTION

This invention relates to an improvement of a camera, and more particularly to an improved photograhic information setting apparatus for a camera.

A camera requires various information to be set, e.g. film speed, F number, exposure time or date of photographing. Conventional camera information setting apparatus includes at least one manually rotatable dial, which is mechanically complex and bulky. If photographic information in the form of an electric signal is required, the mechanical rotation of the dial has to be converted into the required electric signal in such a conventional information setting apparatus.

SUMMARY OF THE INVENTION

It is an object of the present invention to provide an improved information setting apparatus which is compact and requires substantially no mechanical working elements.

According to the present invention, a digital display in the visual indicator starts to change its numerical setting one digit at a time when a manually operable switch is closed. That numerical change can be stopped by opening the switch when a desired digit is observed in the visual indicator, thereby setting the desired information.

By utilizing the information setting apparatus of the present invention, film dating or superimposing of data on the image focused on the film, may be successfully achieved since the display on a compact indicator can be changed without mechanical working components. The elimination of the mechanical working components reduces the complexity and size of the information setting apparatus.

BRIEF DESCRIPTION OF THE DRAWINGS

FIG. 1 is a block diagram showing an exemplary embodiment of the invention;

FIG. 2 is a detailed block diagram of the counter, decoder and digital indicator components of the embodiment of FIG. 1; and FIG. 3 is a diagrammatic view of an exemplary indicating arrangement suitable for use with the embodiment of FIG. 1.

DESCRIPTION OF THE PREFERRED EMBODIMENT

FIG. 1 shows an operative arrangement of exposure control circuit 1, magnet Mg for operating the camera shutter, and power source E. The information setting circuitry comprises clock pulse generator 2, counter 3, decoder 4 and digital indicator 5. Power source switch S1 connects power source E to exposure control circuit 1 and magnet Mg. Power source switches S0 and S2 operate information setting apparatus. Switch S0 is normally closed for actuating counter 3 when the camera is being used and is kept open, for example, when the carmera is not used for a long period of time. Switch S2 is adapted to be closed for superimposing information on an image focussed on a film. Counter 3 counts output pulses from clock pulse generator 2 when switches S0, S2 and S3 are closed. The output of counter 3 is converted by decoder 4 into control signals for the indicating elements in segment-type-digital-indicating portion 5. Counter 3 is connected to power source E through normally closed switch S0.

In order to set data, switch S2 is closed to actuate clock pulse generator 2. When switch S3 is closed, output pulses are counted in counter 3, so that the indication in digital indicator 5 varies. The indication in digital indicator 5 can be observed by the camera operator, as is more fully described hereinafter. When the indication is observed to be the desired digital arrangement, switch S3 is manually opened to interrupt the counting operation of counter 3 so that the digital arrangement is fixed. Thereby, the setting of information is completed, after which a shutter for superimposing that information on an image focussed on the film is opened for effecting the aforesaid data superimposition. Upon completion of the superimposition of information, switch S2 is opened to save electric power.

The information referred to herein is dating information, although the information setting circuitry has applicability to other data as is evident from the description of its structure and operation. Once the information is set, then it may be maintained in counter 3 all day long. If counter 3 were controlled by switch S2, after the superimposition of information and with the opening of switch S2, the counts stored in counter 3 would disappear, thereby requiring the setting of information to be repetitively made again for each superimposition of information and presenting considerable difficulty. Moreover, under the same control conditions, if switch S2 were kept closed, then electric power is consumed by decoder 4 and indicator 5 unnecessarily. However, in the embodiment of the invention, only counter 3 is kept operative by normally closed switch S0 for maintaining the information and the power consumption of counter 3 is insignificant. Further, the inconvenience and difficulties of repeatedly setting the information every time it is needed are avoided.

With reference to FIG. 2, clock pulse generator 2 is provided with two output terminals 2a, 2b. The output at terminal 2a is a pulse having a relatively long period, such as 1 to 2 seconds, and the output of terminal 2b is a pulse having a relatively short period, such as one severalth seconds. In FIG. 1, counter 3 is conveniently shown as a single counter, however, three counters 3a, 3b, 3c are incorporated therein as shown in FIG. 2. Binary counter 3a sets the year, and if preferably twenty years are indicated, then counter 3a has five bits (which actually enables a count up to 32 in the binary system). Counter 3b is a binary counter for setting the month and for changeably indicating 12 months and requires four bits. Counter 3c is a binary counter for setting the day and should count only up to 31 at the maximum, so that counter 3c has five bits. Counters 3a, 3b and 3c may be arranged such that after their respective required maximum counts, they automatically reset to zero.

With reference to clock pulse generator 2, switch S5 is a change-over switch for switching the clock pulse generator output pulses to a desired one of counters 3a, 3b, 3c, and may be operated manually. Switch S4 is manually operated and switches either the long period pulses or the short period pulses to counters 3a, 3b or 3c. The long period pulses 2a are convenient to enable the camera operator to observe the settings and then activate switch S3 to retain the desired data setting. The short period pulse output 2b enables rapid changing of the data.

For setting the date, as has been described earlier, switch S2 is first closed. Then, switch S4 is set to long period output terminal a, and switch S5 is set on contact c. When switch S3 is closed under the above conditions, counter 3c, counts at a time interval of 1 to 2 seconds, while indication in day indicator 5c is advanced through decoder 4c one day at a time. When the day indication conforms with the day that a picture is to be taken, switch S5 is set to contact b to fix the day information in day indicator 5c. Thereby, the count in counter 3b is changed, so that an indication in month indicator 5b is varied at a time interval of 1 to 2 seconds through decoder 4b. Thus, when the month indication conforms to the given month, then switch S5 is set to contact a. Thereby, counter 3a commences counting and when the numerals appearing in year indicator 5a through decoder 4a and counter 3a conform with the given year, then switch S3 is opened. During the aforesaid operation, the digital indication is changed at an interval of 1 to 2 seconds, so that the numerals may be read by the camera operator for a sufficiently long time, and switches S5, S3 may be positively manually operated. As mentioned previously, the short period output signal 2b of clock pulse generator 2 is used for the rapid changing of data.

Meanwhile, when a single indication is desired to be changed, switch S5 is set to one of the desired positions a, b or c, then switch S3 is closed. When the appropriate indicator 5a, 5b or 5c indicates the desired year, month or day, then switch S3 is opened.

FIG. 3 shows one example of a projection arrangement, by which any indication in indicator 5 is projected onto a film. 13 is an objective lens, 12 the film, and in this example, a lens shutter is used and is not shown in the figure. Indicator 5 itself emits light and is seen visually through half mirror 7, and eye-piece 8 in the viewfinder, as part of the viewfinder field of view. Additionally, light from indicator 5 is transmitted through half mirror 7, projecting lens 9, data-superposing shutter 10, and mirror 11, and onto film 12.

In the aforesaid embodiment, segment indicating elements made of luminescent diodes are used as indicating elements. However, liquid crystals may be also used and external light is used for projection onto the film. Instead of projecting the indicating element itself onto the film, a display plate other than indicating elements adapted to be controlled by a decoder may be superposed on the film. For instance, a thin liquid crystal plate for indicating numerals superposed on the entire luminescent surface made of an electro-luminescent plate, may be brought into contact with the back surface of the film for superimposing data thereon. In that case, the indicating portion is a thin plate, thereby enabling the back cover of the camera not to be excessively protruded.

Alternatively, a non-volatile memory circuit adapted to store the data set in counter 3 may be provided between counter 3 and decoder 4. Such a memory circuit may have a retention characteristic lasting for a period of over one month, even if the power source is disconnected, so that the power source for counter 3 may be disconnected after the setting of the data.

The data-superimposing device according to the present invention provides a data indicator which is simply constructed and of a static nature, thus facilitating its assembly without large space requirements, and providing high reliability, because it is electrically and digitally operable.

What is claimed is:

1. Information setting apparatus for a camera comprising:
   means for generating pulses;
   means for counting said pulses and including a plurality of counters;
   means for visually displaying variable digital information represented by the pulse count in said means for counting and including a corresponding number of visual indicators;
   means for decoding the pulse count to change the digital information displayed by said means for displaying in accordance with the pulse count stored in said counting means and including a corresponding number of decoders, each of said decoders changing the digital information indicated by a respective one of said corresponding number of visual indicators in accordance with the number of pulses stored in a respective one of said plurality of counters; and
   manually operable means for initiating the pulse input to said counting means to optionally change the digital information displayed by said means for displaying, or for initiating and subsequently stopping the pulse input to said counting means to optionally fix the digital information displayed by said means for displaying.

2. Information setting apparatus as in claim 1 further comprising means for projecting the image of said displaying means onto the camera film.

3. Information setting apparatus as in claim 2 wherein the camera includes a viewfinder and further comprising means for projecting the image of said displaying means into said camera viewfinder field of view.

4. Information setting apparatus as in claim 1 further comprising manually operable means for selecting one of said pulse counters to receive pulses from said pulse generating means, whereby the digital information of the visual indicator associated with the selected counter is changed.

5. Information setting apparatus as in claim 4 further comprising means for projecting the image of said displaying means onto the camera film.

6. Information setting apparatus as in claim 5 wherein the camera includes a viewfinder and further comprising means for projecting the image of said displaying means into said camera viewfinder field of view.

7. Information setting apparatus as in claim 1 further comprising a power supply and switching means to maintain connection of said power supply to said counting means for enabling the pulses stored therein to be retained.

8. Information setting apparatus as in claim 1 further comprising a power supply, first switch means for connecting said power supply to said pulse counters, second switch means for connecting said power supply to said means for generating pulses, said decoders and said means for displaying, and said manually operable stopping means is a third switch means interconnecting said means for generating pulses and said means for counting.

9. Information setting apparatus as in claim 8 wherein said first, second and third switch means are independently operable.

10. Information setting apparatus as in claim 1 wherein said means for generating pulses includes means for generating first and second pulses, said first pulses having a greater frequency than said second pulses and further comprising switching means having a plurality of switch contacts respectively associated with said plurality of pulse counters, and second switching means having two switch contacts respectively connected to said first and second pulses, and said manually operable stopping means interconnecting said first and second switching means.

11. Information setting apparatus as in claim 10 wherein said first and second switching means are independently operable.

12. Information setting apparatus as in claim 10 wherein the frequency of said first pulses enables observation of the means for displaying and operation of said manually operable stopping means to fix the count in said means for counting at a desired setting.

13. Information setting apparatus as in claim 1 wherein said plurality of pulse counters, said decoders and said visual indicators are each three in number and said visual indicators respectively indicate the day, month and year.

* * * * *